Patented July 10, 1951

2,559,677

UNITED STATES PATENT OFFICE 2,559,677

AMINO-HALOGEN-THIOPHANTHRA-QUINONES

Herman E. Schroeder, Kennett Square, Pa., and Lorraine A. Ringrose, Wilmington, Del., assignors to E. I. du Pont de Nemours & Company, Wilmington, Del., a corporation of Delaware No Drawing. Substituted for abandoned application Serial No. 99,879, June 17, 1949. This application January 19, 1951, Serial No. 206,930

6 Claims. (Cl. 260—329.2)

This invention relates to new thiophanthraquinone compounds, and more particularly to new halogenated aminothiophanthraquinones which may be represented by the general formula:

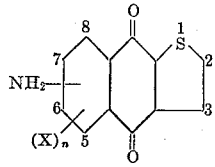

in which the amino group is attached to the benzene nucleus of the thiophanthraquinone in one of the positions 5, 6, 7 and 8, X stands for chlorine or bromine which is attached in the benzene nucleus and at least one of which is in a position ortho or para to the amine group, and $n$ stands for one of the numerals 1 and 2.

This application is filed as a substitute for our application Serial No. 99,879 filed June 17, 1949, now abandoned.

It is an object of this invention to prepare halogen-aminothiophanthraquinones of the above general formula which are valuable intermediates in the preparation of dyes and which also serve as dyes in themselves, particularly for cellulose acetate fibers, nylon, etc.

While a consideration of the reactivity of thiophene would lead one to expect that in the halogenation of aminothiophanthraquinone the halogen would react on the thiophene nucleus before any successful substitution in the benzene ring could be effected, we have found that halogen-aminothiophanthraquinones having desirable properties as dye intermediates, particularly for dyes of the anthraquinone vat dye series, may be prepared by the reaction of aminothiophanthraquinones in which the amino group is in one of the positions 5, 6, 7 and 8 with chlorine or bromine and by the elimination of halogen in the poly-halogenated aminothiophanthraquinones. In these processes products are obtained in relatively pure form without any substitution of halogen in the thiophene ring of the thiophanthraquinone molecule.

Where the halogen-aminothiophanthraquinones are to be used as intermediates in the preparation of dyes, the halogenation is preferably carried out with bromine or bromine liberating agents and the halogenation with either bromine or chlorine is preferably carried out in an inert organic solvent such as nitrobenzene or in an aqueous medium such as water or in a dilute acid solution. The halogenation is usually carried out at temperatures of from 80° to 160° C., although it will be obvious that this temperature can be varied, depending on the particular solvent and other conditions employed. Halogenation catalysts such as iodine may be used.

The following examples are given to illustrate the invention. The parts used are by weight.

Example 1

A mixture of 320 parts of water, 32 parts of 36% hydrochloric acid, 10 parts of 8-aminothiophanthraquinone is heated to the boil, then cooled to 15°–20° C., and a solution of 16 parts of bromine in 42 parts of glacial acetic acid is added over a period of one hour. The charge is stirred at room temperature for several hours, then heated at 80–90° C. for four to five hours, cooled to room temperature and filtered. The violet-red crystalline product is washed acid-free, slurried in dilute ammonia, filtered off, washed alkali-free with water and dried. This product has a melting range of 235°–238° C., and analyzes 40.2% bromine and 3.58% nitrogen. The 8-amino-5,7-dibromothiophanthraquinone is represented by the formula:

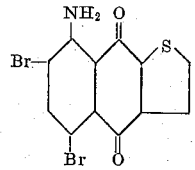

Example 2

To a solution of 120 parts of 80% sulfuric acid and 7.5 parts of aniline is added at room temperature 15 parts of 8-amino-5,7-dibromothiophanthraquinone. The charge is heated at 140°–145° C. for three hours, then cooled and drowned in 800 cc. of cold water. The product is filtered, washed acid-free with water, slurried in dilute ammonia, filtered, washed alkali-free and dried. Recrystallization from monochlorobenzene gives a brown-orange crystalline product which has a melting range of 185°–188° C. and analyzes 26.4% bromine, 4.37% nitrogen and 10.9% sulfur. It is represented by the formula:

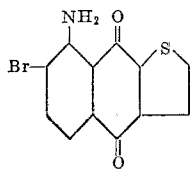

Example 3

A solution of 21 parts of bromine in 21 parts of acetic acid is added dropwise at room temperature to a mixture of 100 parts of nitrobenzene and 10 parts of 7-aminothiophanthraquinone. The charge is stirred several hours at room temperature, heated at 80°–85° C. for two to three hours, then heated at 140°–150° C. for 3½ hours, cooled and filtered. The cake is washed with benzene, slurried in water and the benzene is removed by heating the slurry to boiling. The orange-red needle-like product is filtered, washed and dried. It has a melting range of 275°–280° C. and analyzes 41.3% bromine and 3.67% nitrogen. The 6,8-dibromo-7-aminothiophanthraquinone is represented by the formula:

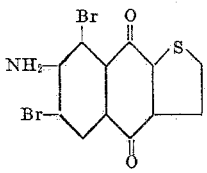

Example 4

To a solution of 96 parts of 80% sulfuric acid and 6 parts of aniline is added at room temperature 12 parts of 6,8-dibromo-7-aminothiophanthraquinone. The charge is heated at 140° C. for 1½ hours, cooled to room temperature and filtered. The cake is washed with 78% sulfuric acid, then slurried in water and the product is filtered, washed acid-free with water and dried. The product, which appears as yellow-orange crystals, has a melting range of 312°–313° C. and analyzes 26.42% bromine and 4.45% nitrogen. The 7-amino-6-bromothiophanthraquinone is represented by the formula:

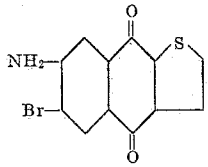

Example 5

The 7-amino-6-bromothiophanthraquinone may be prepared by the addition of 7.7 parts of bromine in 15 parts of acetic acid to 10 parts of 7-aminothiophanthraquinone in 100 parts of nitrobenzene, as described in Example 3. The product is recrystallized from ortho-dichlorobenzene in the form of yellow-orange needles, and has a melting range of 305°–307° C. It analyzes 26.29% bromine, 4.4% nitrogen and 10.04% sulfur.

Example 6

A solution of 7.2 parts of bromine in 5.8 parts of sulfuryl chloride is added over a period of 20 to 30 minutes to a mixture of 160 parts of nitrobenzene, 0.05 part of iodine and 20 parts of 8-benzoylaminothiophanthraquinone (prepared by benzoylation of 8-aminothiophanthraquinone by usual methods). The charge is heated to 103°±4° C. and held there for 3½ hours, then cooled to 8° C., stirred for one hour and filtered. The yellow-orange crystalline product is debenzoylated as follows:

To 100 parts of 82% sulfuric acid is added at 80° C. ten (10) parts of 8-benzoylamino-5-bromothiophanthraquinone (prepared as described above). The charge is held at 80°–85° C. for one hour, cooled and drowned in 300 cc. of ice water. The orange-colored product is filtered off, washed with water, slurried in dilute ammonia, filtered, washed alkali-free with water and dried. It has a melting range of 232°–235° C. and analyzes 25.23% bromine and 4.56% nitrogen. The 8-amino-5-bromothiophanthraquinone is represented by the formula:

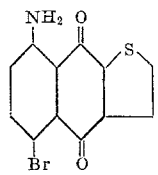

The 8-amino-5-chlorothiophanthraquinone may also be prepared by chlorination of 8-benzoylaminothiophanthraquinone with sulfuryl chloride, followed by debenzoylation of the 8-benzoylamino-5-chlorothiophanthraquinone, as described in this example.

Example 7

A solution of 5 parts of sulfuryl chloride in 10 parts of nitrobenzene is added slowly over several hours to a mixture of 60 parts of nitrobenzene and 7 parts of 7-aminothiophanthraquinone below 20° C. The charge is stirred one hour at 20° C., then several hours at 30° C., and filtered at 15°–20° C. The cake is washed with nitrobenzene and alcohol, then slurried in dilute soda ash solution and the yellow-orange needle-like product is filtered, washed alkali-free with water and dried. It has a melting range of 231°–233° C., and analyzes 13.88% chlorine and 12.07% sulfur. The 8-chloro-7-aminothiophanthraquinone is represented by the formula:

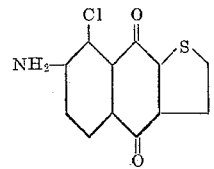

As illustrated above, the new products of this invention may be prepared by halogenating the acylated aminothiophanthraquinones with subsequent deacylation to give the free amino compound. They may also be prepared by halogenating the aminothiophanthraquinone to a polyhalogenated compound and then dehalogenating by the usual methods, such as with aniline in the presence of concentrated sulfuric acid.

In the same manner as illustrated in the above examples where illustrations have been given for the general procedure for the preparation of this new class of compounds, other aminohalogenthiophanthraquinones can be produced, for instance, the 6-aminothiophanthraquinone when brominated in the same manner as given in Example 3 gives the 6-amino-5,7-dibromothiophanthraquinone which is an orange product somewhat redder in shade than the 7-amino-6,8-dibromothiophanthraquinone. The 6-amino-7-bromothiophanthraquinone may be obtained from the 6-amino-5,7-dibromothiophanthraquinone by the same procedure as described in Example 4 for the isomeric product. The 5-aminothiophanthraquinone may be brominated by the same process as described in Example 1 to give the 5 - amino - 6,8 - dibromothiophanthraquinone, and this compound may be partially debrominated, as more particularly described in Example 2, to yield the 5-amino-6-bromothiophanthraquinone.

The halogenated aminothiophanthraquinones are excellent colors for synthetic fibers such as cellulose acetate or nylon, giving bright dyeings deeper in hue and showing generally better light-fastness when compared with the corresponding anthraquinone derivatives. The shade of some of these new compounds on cellulose acetate is as follows:

8 - chloro-7-aminothiophanthraquinone—Golden
8-amino-7-bromothiophanthraquinone—Red
8 - amino-5-bromothiophanthraquinone—Scarlet
8 - amino - 5,7 - dibromothiophanthraquinone—Pink These compounds exhibited similar behavior in the dyeing of nylon as they exhibited in the dyeing of cellulose acetate fibers.

These new halogenated aminothiophanthraquinones are of particular value as intermediates in the synthesis of new vat dyes, as well as in the synthesis of dyes for wool and synthetic fibers. The vat dyes produced from these new halogen-aminothiophanthraquinone compounds in general are deeper in shade and more readily vattable than the analogous anthraquinone dyes, and in general exhibit superior printing properties. From these new intermediates, colors of desirable shade and application and fastness properties are obtainable which have not heretofore been available. The halogen-aminothiophanthraquinones of this invention are of special utility in the synthesis of valuable oxazole compounds more particularly described in copending applications Serial Nos. 99,877 and 99,878.

The aminothiophanthraquinones employed as the starting materials for the production of the compounds of this invention may be prepared by the processes described in detail in U. S. Patent No. 2,501,132 of March 21, 1950. The 8-aminothiophanthraquinone (having a melting point of 231°–232° C.) is preferably prepared from either the 3- or 6-amino-ortho-(2-thenoyl)-benzoic acids (or mixtures of the same) by effecting ring closure in 10 parts of 96% to 100% sulfuric acid at temperatures of from 125° to 140° C. The 6-aminothiophanthraquinone (having a melting point of 274°–275° C.) is prepared in a similar manner from either the 4- or 5-amino-ortho-(2-thenoyl)-benzoic acids, or mixtures of the same.

The 7-aminothiophanthraquinone (having a melting point of 271° C.) is preferably prepared by the ring closure of either the 4- or 5-nitro-ortho-(2-thenoyl)-benzoic acids (or mixtures of the same) with substantially 100% sulfuric acid at temperatures of from 70° to 160° C., with subsequent reduction of the nitro group. The ring closure may, if desired, be carried out in from one to ten minutes by maintaining the temperature at 120° to 160° where from 97% to 100% sulfuric acid is employed. The nitro group may be reduced to the amine with sodium hydrosulfite in sodium hydroxide solution. The 5-aminothiophanthraquinone (having a melting point of 235°–236° C.) may be prepared in the same manner from the 3-nitro- or the 6-nitro-ortho-(2-thenoyl)-benzoic acids, or mixtures of the same.

The nitro-substituted thiophanthraquinones are more particularly disclosed and claimed in U. S. Patent 2,501,131 of March 21, 1950.

The nitro-ortho-(2-thenoyl)-benzoic acids used in the preparation of the above aminothiophanthraquinones may be prepared in good yields and purity by the processes described in general in Lee & Weinmayr U. S. Patent 2,513,573 of July 4, 1950. The nitro-substituted phthalic anhydride may be reacted with the Grignard reagent prepared from 2-bromo-thiophene or 2-iodothiophene, or it may be prepared by condensing the nitrophthalic anhydride with thiophene by the usual Friedel-Crafts synthesis with the aid of aluminum chloride or similar condensing agent. The 5-nitro-2-(2-thenoyl)-benzoic acid is readily obtained in good yields by reacting thiophene with 2-carbomethoxy-5-nitrobenzoyl chloride in nitrobenzene in the presence of aluminum chloride, followed by hydrolysis of the ester to the nitrothenoyl benzoic acid. The 2-carbomethoxy-3-(and 5)-nitrobenzoic acids are preferably produced from the corresponding nitrophthalic anhydrides by carrying out the esterification in an inert organic diluent which has a boiling point above 170° C. but which exhibits negligible solvent action on the monomethyl ester, such as nitrobenzene or the chlorobenzenes, at 20° to 40° C., using from 1 to 1.1 mol proportions of methanol. The preparation of various nitrothenoyl benzoic acid methyl esters is the subject of U. S. Patent 2,519,040 of August 15, 1950. Where the amino-ortho-(2-thenoyl)-benzoic acid is desired, the corresponding nitro compound may be reduced to the amine either in caustic solutions with zinc or iron or by means of hydrogen in the presence of a nickel catalyst.

We claim:
1. The amino - halogen - thiophanthraquinone compounds of the following general formula:

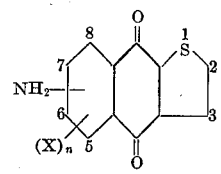

in which the amino group is attached to the benzene nucleus of the thiophanthraquinone in one of the positions 5, 6, 7 and 8, X stands for halogen of the group consisting of chlorine and bromine which halogen is attached to the benzene nucleus, at least one halogen being in one of the positions ortho and para to the amine group, and $n$ stands for one of the numerals 1 and 2.

2. The ortho - amino - chloro-thiophanthraquinones in which both the amino and chlorine are contained in the benz ring of the thiophanthraquinone molecule, which have the formula:

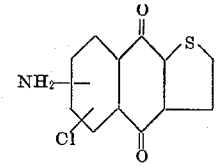

3. 8 - chloro - 7 - aminothiophanthraquinone of the formula:

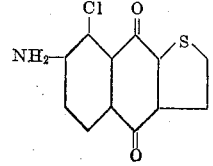

4. 7-amino-6,8-dibromothiophanthraquinone of the formula:

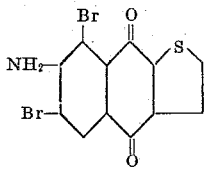

5. 8-amino-5,7-dibromothiophanthraquinone of the formula:

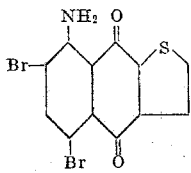

6. The ortho-amino-bromo-thiophanthraquinones in which both the amino and bromine are contained in the benz ring of the thiophanthraquinone molecule, which have the formula:

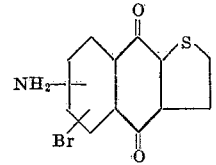

HERMAN E. SCHROEDER.
LORRAINE A. RINGROSE.

REFERENCES CITED

The following references are of record in the file of this patent:

UNITED STATES PATENTS

| Number | Name | Date |
|---|---|---|
| 1,818,311 | Drescher | Aug. 11, 1931 |
| 1,858,334 | Loveluck | May 17, 1932 |
| 2,084,970 | Dettwyler | June 22, 1937 |